April 21, 1936.  W. G. WALL  2,037,869
SLACK TAKE-UP AND FORCE MULTIPLIER FOR BRAKES
Original Filed Feb. 2, 1933  2 Sheets-Sheet 1
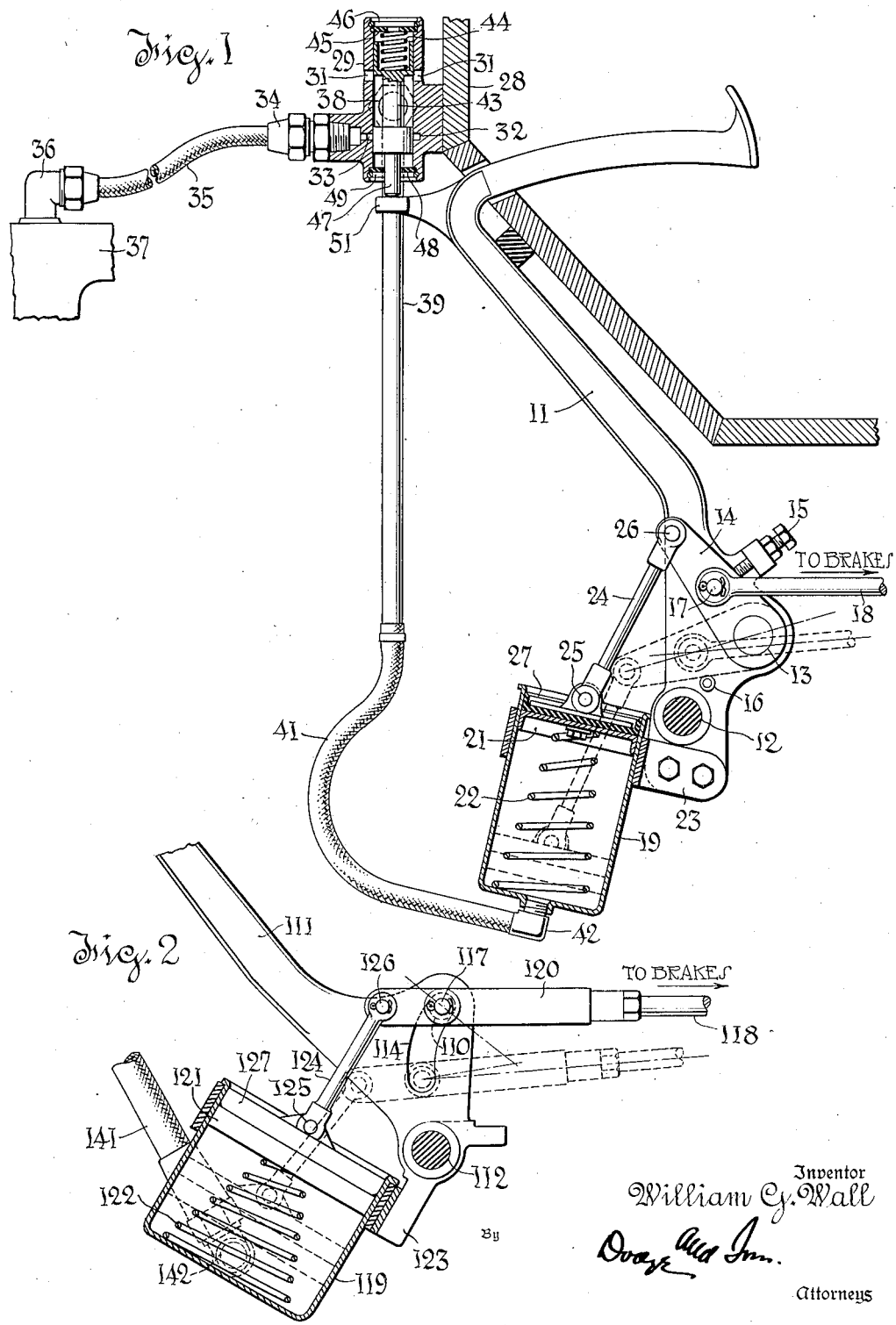

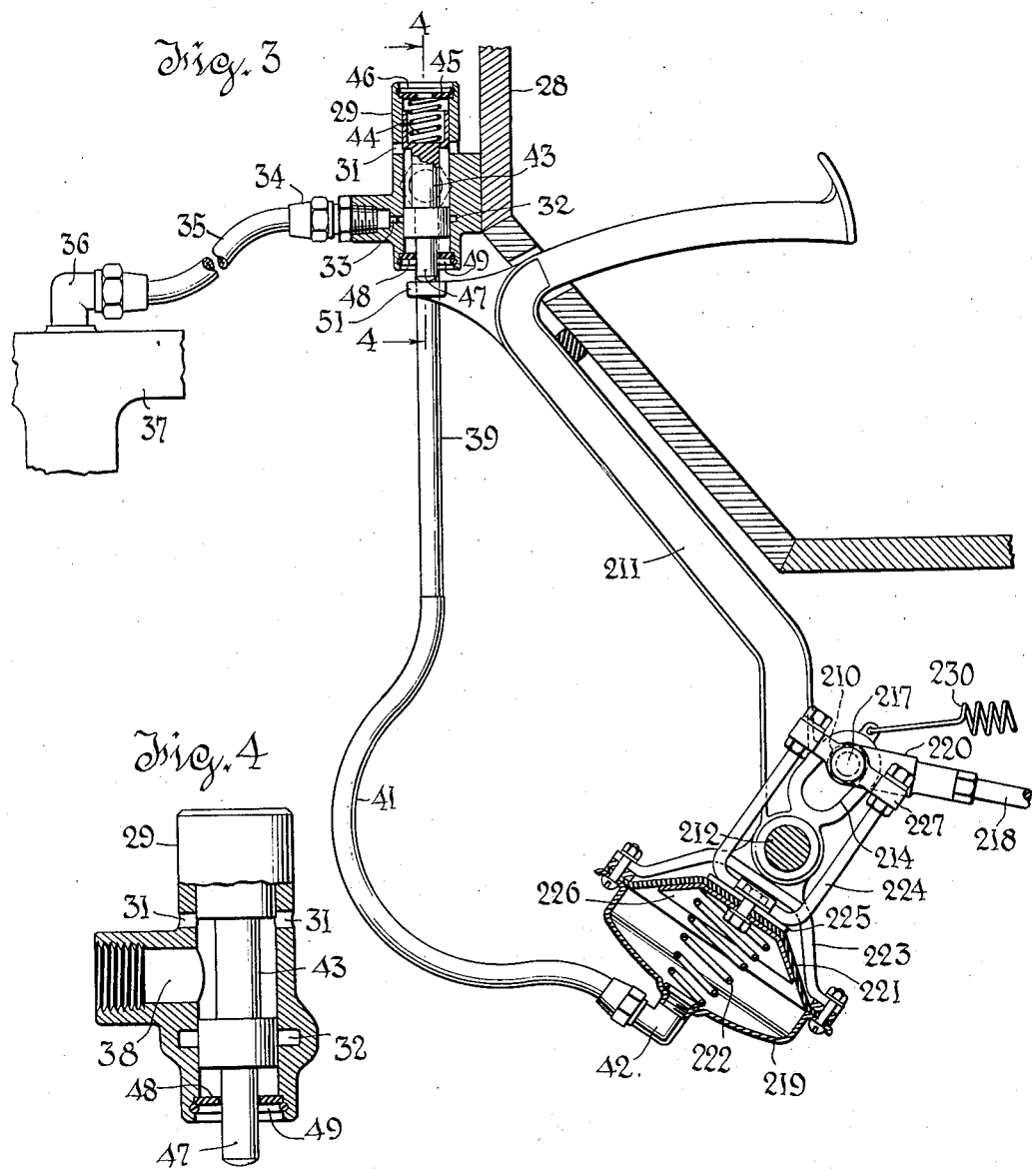

Patented Apr. 21, 1936

2,037,869

UNITED STATES PATENT OFFICE 2,037,869

SLACK TAKE-UP AND FORCE MULTIPLIER FOR BRAKES

William G. Wall, Indianapolis, Ind., assignor to The New York Air Brake Company, a corporation of New Jersey Application February 2, 1933, Serial No. 654,959
Renewed March 18, 1935

12 Claims. (Cl. 74—516)

This invention relates to devices for taking up slack travel and simultaneously multiplying the force ratio in lever linkages. The invention is especially suited to use in connection with pedal-actuated brakes, and will be so described.

In prior applications Serial Nos. 609,524 and 609,525, filed May 5, 1932, I have described and claimed devices of this type involving the use of take-up linkages and specifically toggle take-up linkages which are motor actuated, the motor being controlled somewhat indirectly by pedal movement. Consequently, no broad claim is here made to the general combinations above outlined.

The claimed novelty in the present mechanisms resides in mounting the take-up directly on the brake pedal or a part rigid therewith; also in actuating the control valve directly by the brake pedal or a part rigid therewith, and in certain modifications of the take-up to produce the approximate equivalent of the toggle linkage, with gains in economy and simplicity.

Several specifically different embodiments of the invention are illustrated in the accompanying drawings, in which,—

Fig. 1 is a view, partly in side elevation and partly in section, showing an automobile foot brake pedal with toggle arm and motor mounted directly on an extension carried by the pedal, and showing a control valve of the balanced piston type directly actuated by the pedal.

Fig. 2 is a fragmentary view, similar to a portion of Fig. 1, but showing the substitution for the toggle arm of a roller working in an arcuate slot.

Fig. 3 is a similar view showing the use of a straight slot. In this embodiment a diaphragm motor is used.

Fig. 4 is an enlarged axial section through the control valve, the plane of section being indicated by the line 4—4 in Fig. 3.

Because sub-atmospheric pressure ("suction") is available in the intake manifolds of gasoline engines, it is convenient to use, on automobiles, a piston or diaphragm motor actuated by the differential between this sub-atmospheric pressure and atmospheric pressure. The specific type of motor is immaterial and the substitution of various other motors, particularly expansible chamber motors, is recognized to be possible. In such case the control mechanism (here shown as a valve) may be appropriately modified without departing from the invention.

Referring first to Fig. 1, the brake pedal 11 is fulcrumed at 12, in any known way, and carries pivoted to it at 13 the toggle take-up link 14. The link 14 swings between an adjustable screw stop 15 and a fixed stop 16 and is pinned at 17 to the pull rod 18 which may lead to brakes or some equivalent device to be actuated by depressing pedal 11.

The angular relation of rod 18 to toggle link 14 is such that pull in the rod urges link 14 toward whichever of the stops 15 and 16 it engages. The arc traversed by pin 17, when arm 14 moves from stop 15 to stop 16, is such as to reduce the radial distance from fulcrum 12 to pin 17 and at the same time to displace pin 17 angularly in a counterclockwise direction relatively to pedal 11. In this way the force ratio between pedal 11 and rod 18 is increased and slack is drawn up. Preferably the amount of slack take-up is as nearly as possible equal to the running slack in the linkage, so that, taking a brake system as an example, the motion of toggle link 14 from stop 15 to stop 16 just brings the brakes to the point of application.

To shift the link 14 upon a slight initial motion of pedal 11, a motor comprising a cylinder 19, piston 21, and return spring 22 is used. The cylinder is mounted on pedal 11 below fulcrum 12 by means of bracket 23 and the piston is connected with toggle link 14 by means of connecting rod 24 pivoted to the piston at 25 and to the link at 26.

Instead of pivoting rod 24 directly to link 14, an indirect connection might be made by pinning rod 24 to rod 18 in either of the ways indicated in Figs. 2 and 3. The operative principle would be the same.

Since the motor is to operate by "suction" the lower end of cylinder 19 is closed and the upper end is open to atmosphere. The piston 21 is sealed by an outwardly flanged cup leather 27 and the spring 22 urges the piston 21 upward. Thus under normal running condition toggle link 14 is against stop 15.

The control valve is mounted directly on the bulkhead 28 or other fixed support and comprises a cylindrical, open-ended body 29 with atmospheric ports 31 and sub-atmospheric ("suction") port 32. The port 32 is connected by passage 33, nipple 34, tube 35 and nipple 36, with any volume maintained at sub-atmospheric pressure, here conventionally represented as an intake manifold 37. Between ports 31 and 32 the body 21 has a large motor cylinder port 38 (see Fig. 4) which is connected by tube 39, flexible hose 41 and nipple 42, with the lower end of cylinder 19.

Slidable in body 29 is a balanced piston valve 43 of the inside lap type. This comprises two heads with reduced connecting neck, as shown. It is urged downward by compression spring 44 which seats in a recess in the upper head of valve 43 and reacts against the ported disc 45 which is held in the recessed end of body 29 by an ordinary snap ring 46.

The valve 43 has at its lower end a projecting stem 47 which projects freely through the central aperture in disc 48, held in a recess in the lower end of body 29 by another snap ring 49. Disc 45 serves as a seat for spring 44 and disc 48 as a limit stop for valve 43.

The pedal 11 is held up (in the position shown in Fig. 1) by a pull exerted through rod 18 by the brake releasing springs or their equivalent (not shown but common in the art). In such position a cam nose 51 on pedal 11 engages stem 47 and holds valve 43 in an upper position in which it connects ports 31 and 38. From this it follows that both sides of piston 21 are subject to atmospheric pressure and spring 22 forces the piston to its upper limit of motion, as shown.

It should be observed that the upper face of cam 51 is secant to the arc through which it swings about fulcrum 12 and hence does not act on stem 47 in simple thrust.

A slight depression of pedal 11 frees stem 47 and spring 44 moves valve 43 to its lower limit of motion in which it blanks atmospheric port 31 and connects suction port 32 with motor cylinder port 38. The effect of this is to subject the lower face of piston 21 to sub-atmospheric pressure while the upper face thereof remains exposed to atmospheric pressure, so that piston 21 overpowers spring 22 and draws link 14 against stop 16.

This motion takes up slack and increases the force ratio. Hence further depression of the pedal will apply the brakes with great force, without the exertion of undue force on the pedal. If the motor should fail to work, as it would if the gasoline engine were not running, the pedal 11 would still apply the brakes, but at the normal (lower) force ratio.

Many modifications of structural detail are possible, and some of these are suggested in Figs. 2 and 3.

In Fig. 2 the pedal lever is indicated at 111, its fulcrum at 112, and the brake pull rod at 118. The motor parts 119 to 127 and 141—142, correspond to and are functionally identical with the parts 19 to 27 and 41—42 of Fig. 1. The motor could, and ordinarily would be, controlled by a valve mechanism identical with that already described, or any equivalent. For the toggle link 14 and stops 15 and 16, of Fig. 1, there is substituted an arcuate slot 114 which is formed in a portion of pedal 111, and guides pin 117 in the same arcuate path that would be afforded by a toggle link. Pin 117 passes through slot 114 and through the arms of a forked clevis 120 which is mounted on rod 118 and straddles pedal 111. An anti-friction roller 110 may be used between the pin and slot. The pin 126 also engages the arms of the forked clevis 120 and connects rod 124 thereto. The operation of the parts will be readily understood to be the same as that described with reference to Fig. 1.

In Fig. 3 the pedal lever is indicated at 211, its fulcrum shaft at 212 and the brake pull rod at 218. The valve and related parts 29 to 51 inclusive are identical with similarly numbered parts on Fig. 1. The pedal 211, below fulcrum 212, has a forked bracket 223 which carries the shell 219 of a diaphragm motor. Nipple 42 is connected thereto.

A motor diaphragm 221 is clamped at its periphery to the shell 219. A dished follower 226 and disc 225 clamp between them the central portion of diaphragm 221. Rigidly attached to disc 225 are two U-shaped stirrup irons 224, each of which straddles shaft 212, one stirrup iron being on each side of pedal 211. A spring 222 urges follower 226 upward. A spring 230 may be used to urge pedal 211 upward, or if preferred, the pedal may be drawn up solely by brake rod 218 as in the structures of Figs. 1 and 2, spring 230 being omitted.

The functions of pins 17 and 26 of Fig. 1 are combined in a single pin here shown as a bolt 217. This bolt 217 is mounted at its ends in yokes 227 which are removably clamped by nuts on the ends of the stirrups 224. Fitting between the yokes 227 and straddling pedal 211 is the forked end of clevis 220 on brake pull-rod 218. The bolt 217 passes through the forked end of clevis 220 and through a roller 210 mounted between the arms of the forked clevis, and working in slot 214 in pedal 211.

In the embodiment of the invention shown in Fig. 3, the slot 214 is straight but not radial, the obliquity of the slot and its length being chosen to give the desired take-up with the desired increase of force ratio.

Various forms of curved slot might be used, in the embodiments of Figs. 2 and 3, the invention not being limited to the use of an arcuate slot or a straight slot. By variations in the design of the slot the character of the take-up action may be varied, but this is largely a matter of design.

In the structures of Figs. 1 and 2 there is a toggle action which causes the link 14 or roller 110 (as the case may be) to be urged toward whichever of its limiting positions it approaches. This protects the motor entirely from braking stress. In the structure of Fig. 3 this toggle action is absent in the initial range of pedal depression, so that the motor then receives part of the braking stress, but under conditions which afford the motor a great mechanical advantage. Moderate angular displacement of the pedal so changes the angularity of the slot and rod that the toggle effect develops. Consequently in this case also, the motor is protected from undue stress.

In any of the three forms illustrated the parts may be so proportioned that the motor actually applies the brakes, but as such application is not graduated it is undesirable. Preferably appreciable application of the brakes by the motor is avoided, and the parts are so designed that with the brakes adjusted for minimum running slack the motor brings the brakes just to the point of application.

By so proportioning the parts that the motor makes a slight initial application of the brakes, it is possible to cause the motor to take up a little brake shoe wear, but this is considered undesirable, because the amount of wear so taken up cannot be large, and the effect is to increase useless wear on the brakes in the hands of the average driver.

In Fig. 3 the pull of the motor is substantially through the axis of shaft 212 so that no turning moment is imposed on pedal 211. In the structures of Figs. 1 and 2 there is a turning moment which resists slightly depression of the pedal. It is inadvisable to place the motor so that its line of action is substantially to the rear of shaft 212 for the reaction between the pedal and the pull rod tends to depress the pedal. The effect is to cause the pedal to rise sluggishly when released, or even not to rise far enough to operate the valve.

What is claimed is,—

1. The combination of a pedal lever; a rod; a shiftable take-up and leverage changing connection, between said pedal and rod; a motor mounted directly on said pedal and connected to shift said connection; and a valve arranged to be actuated directly by said pedal and controlling said motor.

2. The combination of a pedal lever; a rod; a toggle link pivoted to the pedal and to said rod; stops limiting the motion of said toggle link; a motor mounted directly on said pedal and connected to shift said link between its limiting positions; and a valve arranged to be actuated directly by said pedal and controlling said motor.

3. The combination of a pedal lever; a rod; a pin and slot connection between said pedal and rod, the slot being so arranged that the shifting of the pin in the slot in one direction takes up slack and increases the force ratio between the pedal and rod; a motor mounted directly on said pedal and connected to shift said pin; and a valve arranged to be actuated directly by said pedal and controlling said motor.

4. The combination of a pedal lever; a rod; a connection between said pedal and rod arranged to be shifted between two positions, in one of which the force relation between said pedal and rod is increased and slack is taken up; a reversible motor mounted directly on said pedal and connected to shift said shiftable connection; and a reversing valve of the balanced piston type arranged to be actuated directly by said pedal as the latter moves through a limited range adjacent its normal position.

5. The combination of a pedal lever; a rod; a connection between said pedal and rod arranged to be shifted between two positions, in one of which the force relation between said pedal and rod is increased and slack is taken up; a reversible motor mounted directly on said pedal and connected to shift said shiftable connection; a reversing valve of the balanced piston type connected to control said motor; and a cam member on said pedal adapted to engage and shift said valve as the pedal arrives in one limiting position.

6. The combination of a lever having a normal position; a rod; a pin and slot connection between said lever and rod, the slot being so arranged that the shifting of the pin in the slot in one direction takes up slack and increases the force ratio between the lever and rod; a motor connected to shift said pin from end to end of said slot; and a reversing valve controlling said motor and arranged to be actuated by the motion of said lever through a small angle adjacent said normal position.

7. The combination of a lever; a rod; a pin and slot connection between said lever and rod, a slot being so arranged that the shifting of the pin in the slot in one direction takes up slack and increases the force ratio between the lever and rod; a motor mounted directly on said lever and connected to shift said pin from end to end of said slot; and a reversing valve controlling said motor and arranged to be actuated directly by said lever, the slot being so formed that when the pin is shifted to its limit of motion in the direction stated, the force reaction between the lever and rod is exerted through the pin and the end of the slot whereby the motor is protected against such force reaction.

8. The combination of a lever having a normal position; a rod; a pin and slot connection between said lever and rod; a motor connected to shift said pin from end to end of said slot; and a reversing valve controlling the reverse movements of said motor and arranged to be shifted as the lever moves through a small range of angular motion adjacent said normal position, said slot being so arranged relatively to the fulcrum of the lever, the direction of stress exerted through the rod, and the direction of shift of the motor, that when the lever is moved through a small angle from its normal position, the valve causes the motor to shift the pin to take up slack and increase the force ratio between the lever and rod, and further motion of said lever so angularly displaces the slot that the ensuing force reaction between the lever and rod retains the pin in that end of the slot to which the motor has shifted it, whereby the motor is protected from the force reaction between the lever and rod.

9. The combination of a lever having a normal position; a rod; a pin and slot connection between said lever and rod; a motor mounted directly on said lever and connected to shift said pin from end to end of said slot; and a reversing valve controlling the reverse movements of said motor and arranged to be actuated directly by said lever as the lever moves through a small range of angular motion adjacent said normal position, said slot being so arranged relatively to the fulcrum of the lever, the direction of stress exerted through the rod and the direction of shift of the motor, that when the lever is moved through a small angle from its normal position, the valve causes the motor to shift the pin to take up slack and increase the force ratio between the lever and rod, and further motion of said lever so angularly displaces the slot that the ensuing force reaction between the lever and rod retains the pin in that end of the slot to which the motor has shifted it, whereby the motor is protected from the force reaction between the lever and rod.

10. The combination of a pedal lever having a normal position; a rod; a shiftable take-up and leverage-changing connection between said pedal and rod; a motor mounted directly on said pedal and connected to shift said connection; and a reversing valve controlling said motor and arranged to be actuated by the motion of said pedal lever through a small angle adjacent said normal position.

11. The combination of a pedal lever having a normal position; a rod; a toggle link pivoted to the pedal and to said rod; stops limiting the motion of said toggle link; a motor mounted on said pedal and connected to shift said link between its limiting positions; and a reversing valve controlling said motor and arranged to be actuated by the motion of said pedal lever through a small angle adjacent said normal position.

12. The combination of a pedal lever having a normal position; a rod; a pin and slot connection between said pedal and rod, the slot being so arranged that the shifting of the pin in the slot in one direction takes up slack and increases the force ratio between the pedal and rod; a motor mounted directly on said pedal and connected to shift said pin; and a reversing valve controlling said motor and arranged to be actuated by the motion of said pedal lever through a small angle adjacent said normal position.

WILLIAM G. WALL.